(12) United States Patent
Wang

(10) Patent No.: US 12,476,741 B2
(45) Date of Patent: Nov. 18, 2025

(54) METHODS AND APPARATUS OF HARQ OPERATION FOR TRANSMISSION OF MULTICAST BROADCAST SERVICE

(71) Applicant: MediaTek Singapore Pte. Ltd., Singapore (SG)

(72) Inventor: Xuelong Wang, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 18/352,142

(22) Filed: Jul. 13, 2023

(65) Prior Publication Data
US 2023/0361932 A1    Nov. 9, 2023

Related U.S. Application Data

(63) Continuation of application No. PCT/CN2021/120149, filed on Sep. 24, 2021, which
(Continued)

(30) Foreign Application Priority Data

Sep. 28, 2020    (WO) ................ PCT/CN2020/118485
Sep. 24, 2021    (WO) ................ PCT/CN2021/120149

(51) Int. Cl.
*H04L 1/1812*    (2023.01)
*H04L 5/00*    (2006.01)

(52) U.S. Cl.
CPC .......... *H04L 1/1812* (2013.01); *H04L 5/0055* (2013.01)

(58) Field of Classification Search
None
See application file for complete search history.

(56) References Cited

U.S. PATENT DOCUMENTS 8,005,027 B2 *   8/2011   Ye .......................... H04L 1/1845
                                           370/278
8,588,165 B2 *   11/2013   Marinier ............. H04W 28/065
                                           370/464
(Continued)

OTHER PUBLICATIONS

Mediatek Inc. "R2-2006575 UE Reception Model of NR MBS Radio Bearer and its Dynamic PTM/PTP switch" 3GPP TSG-RAN WG2 Meeting #111 electronic, Aug. 28, 2020 (Aug. 28, 2020). (Year: 2020).*

(Continued)

*Primary Examiner* — Daniel F. McMahon
(74) *Attorney, Agent, or Firm* — Helen Mao; Imperium Patent Works

(57) ABSTRACT

Apparatus and methods are provided for Hybrid Automatic Repeat Request (HARQ) operation with a user equipment (UE) combined HARQ process for the multicast broadcast services (MBS). The UE established a UE combined HARQ process to receive HARQ transmissions for the MBS from both the point-to-mjultipoint (PTM) leg and the point-to-point (PTP) leg. The HARQ transmission received from the PTM leg is from a network PTM HARQ process and the HARQ transmission received from the PTP leg is from a network PTP HARQ process for the UE. The new data indicator (NDI) or the redundant version (RV) value is used to indicate a HARQ retransmission. The network PTM and PTP HARQ processes use the same HARQ ID. HARQ ID information is carried in DCI for the PTM leg and the PTP leg for MBS data packets.

20 Claims, 4 Drawing Sheets

Related U.S. Application Data is a continuation of application No. PCT/CN2020/118485, filed on Sep. 28, 2020.

(56) References Cited

U.S. PATENT DOCUMENTS

| | | | | |
|---|---|---|---|---|
| 8,718,695 B2* | 5/2014 | Peisa | ............... | H04W 52/0229 |
| | | | | 370/318 |
| 8,755,337 B2* | 6/2014 | Beming | ............ | H04W 72/1273 |
| | | | | 370/329 |
| 2006/0240766 A1* | 10/2006 | Wilde | ................... | H04W 52/32 |
| | | | | 455/3.01 |
| 2023/0110505 A1* | 4/2023 | Wang | ....................... | H04L 1/08 |
| | | | | 370/331 |
| 2023/0171566 A1* | 6/2023 | Wang | ..................... | H04W 4/06 |
| | | | | 370/312 |

OTHER PUBLICATIONS

D. Striccoli, G. Piro and G. Boggia, "Multicast and Broadcast Services Over Mobile Networks: A Survey on Standardized Approaches and Scientific Outcomes," in IEEE Communications Surveys & Tutorials, vol. 21, No. 2, pp. 1020-1063, Secondquarter 2019, (Year: 2019).*

European Intellectual Property Office Action 21871573.8-1206, dated Sep. 6, 2024.

Mediatek Inc: "UE Reception Model of MBS Radio Bearer and Itsdynamic PTM/PTP Switch".

* cited by examiner

METHODS AND APPARATUS OF HARQ OPERATION FOR TRANSMISSION OF MULTICAST BROADCAST SERVICE

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/120149, titled "Methods and apparatus of HARQ Operation for Transmission of Multicast Broadcast Service," with an international filing date of on Sep. 24, 2021. International Application PCT/CN2021/120149, in turn, claims priority under 35 U.S.C. § 120 and § 365(c) from International Application No. PCT/CN2020/118485, titled "Methods and apparatus of HARQ Operation for Transmission of Multicast Broadcast Service," with an international filing date of Sep. 28, 2020. The disclosure of the foregoing document is incorporated herein by reference.

TECHNICAL FIELD

The disclosed embodiments relate generally to wireless communication, and, more particularly, to hybrid automatic repeat request (HARQ) operation for transmission of multicast broadcast service.

BACKGROUND

With the exponential growth of wireless data services, the content delivery to large mobile user groups has grown rapidly. Initial wireless multicast/broadcast services include streaming services such as mobile TV and IPTV. With the growing demand for large group content delivery, recent application development for mobile multicast services requires highly robust and critical communication services such as group communication in disaster situations and the necessity of public safety network-related multicast services. The early 3GPP in the LTE standard defines enhanced multimedia broadcast multicast services (eMBMS). The single-cell point to multipoint (SC-PTM) services and multicast-broadcast single-frequency network (MBSFN) is defined. The fifth generation (5G) multicast broadcast services (MBS) are defined based on the unicast 5G core (5GC) architecture. A variety of applications may rely on communication over multicast transmission, such as live stream, video distribution, vehicle-to-everything (V2X) communication, public safety (PS) communication, file download, and so on. In some cases, there may be a need for the cellular system to enable reliable multicast/broadcast transmission to ensure the reception quality at the UE side. Reception and transmission for MBS in the NR system require higher reliability. To ensure higher reliability, feedback on the reception of the MBS data packets, which helps the network to perform necessary retransmission, is needed. Further, the traditional way of transmission and reception on a single point-to-multipoint (PTM)/multicast radio bearer (RB) does not meet the requirements of MBS reliabilities for many services. With the new requirements for the feedback on MBS services, the traditional HARQ process needs to handle the MBS feedback requirements.

Improvements and enhancements are required to support MBS HARQ transmission and reception.

SUMMARY

Apparatus and methods are provided for HARQ operation with a UE combined HARQ process for the MBS. In one novel aspect, the UE established a UE combined HARQ process to receive HARQ transmissions for the MBS from both the PTM leg and the point-to-point (PTP) leg. The UE combines received MBS data packets based on outputs of the UE combined HARQ process and sends HARQ feedback to the network node. In one embodiment, the HARQ transmission received from the PTM leg is from a network PTM HARQ process and the HARQ transmission received from the PTP leg is from a network PTP HARQ process for the UE. In one embodiment, the UE receives initial transmission from the PTM leg. The UE receives HARQ retransmission from the PTM leg or the PTP leg. In one embodiment, new data indicator (NDI) is used to indicate a HARQ retransmission. In another embodiment, redundant version (RV) value is used to indicate a HARQ retransmission. In one embodiment, the RV value for the PTM leg is preconfigured and the RV value for the PTP leg is calculated based on the RV value configuration for the PTM leg. In another embodiment, the RV value for the network PTP HARQ process is delivered from the network PTM HARQ process to the network PTP HARQ process. In one embodiment, the combined HARQ process sends HARQ feedback for data packets received from the PTM leg through the PTM leg and sends HARQ feedback for data packets received from the PTP leg through the PTP leg. In one embodiment, the network PTM HARQ process and the network PTP HARQ process uses the same HARQ ID. In another embodiment, HARQ ID information is carried in downlink control information (DCI) for the PTM leg and the PTP leg for MBS data packets, and wherein the combined HARQ process associates MBS data packets received from the PTM leg and the PTP leg based on the HARQ ID information.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Aspects of the present disclosure provide methods, apparatus, processing systems, and computer readable mediums for NR (new radio access technology, or 5G technology) or other radio access technology. NR may support various wireless communication services, such a enhanced mobile broadband targeting wide bandwidth, millimeter wave targeting high carrier frequency, massive machine type communications targeting non-backward compatible MTC techniques, and/or mission critical targeting ultra-reliable low-latency communications. These services may include latency and reliability requirements. These services may also have different transmission time intervals (TTI) to meet respective quality of service (QoS) requirements. In addition, these services may co-exist in the same subframe.

Figure 1:
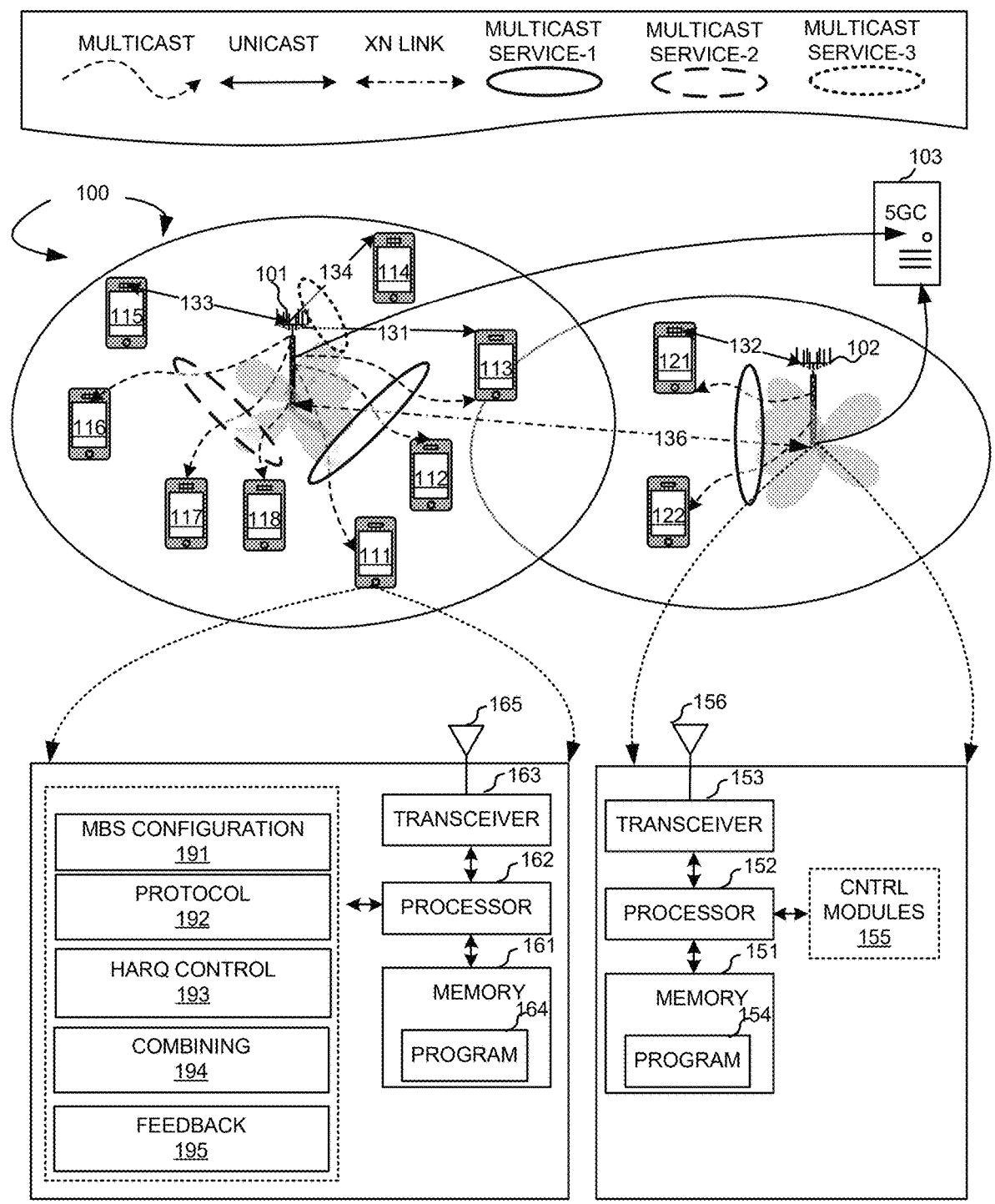
FIG. 1 is a schematic system diagram illustrating an exemplary NR wireless network that supports the UE combined HARQ process for MBS in a wireless network.

FIG. 1 is a schematic system diagram illustrating an exemplary NR wireless network that supports the UE combined HARQ process for MBS in a wireless network. A wireless system 100, such as a NR system, includes one or more fixed base infrastructure units forming a network distributed over a geographical region. The base unit may also be referred to as an access point, an access terminal, a base station, a Node-B, an eNode-B (eNB), a gNB, or by other terminology used in the art. The network can be homogeneous network or heterogeneous network, which can be deployed with the same frequency or different frequency. gNB 101 and gNB 102 are base stations in the NR network, the serving area of which may or may not overlap with each other. The backhaul connection such as 136, connects the non-co-located receiving base units, such as gNB 101 and gNB 102. These backhaul connections, such as connection 136, can be either ideal or non-ideal. gNB 101 connects with gNB 102 via Xn interface. The base stations, such as gNB 101 and gNB 102, connects to the 5G core (5GC) network 103 through network interfaces, such as N2 interface for the control plane and N3 interface for the user plane.

NR wireless network 100 also includes multiple communication devices or mobile stations, such as user equipments (UEs) 111, 112, 113, 114, 116, 117, 118, 121 and 122. The UE may also be referred to as mobile station, a mobile terminal, a mobile phone, smart phone, wearable, an IoT device, a table let, a laptop, or other terminology used in the art. The mobile devices can establish one or more unicast connections with one or more base stations. For example, UE 115 has unicast connection 133 with gNB 101. Similarly, UEs 121 connects with gNB 102 with unicast connection.

In one novel aspect, one or more radio bearers are established for one or more multicast sessions/services and the UE provides uplink feedback. A multicast service-1 is provided by gNB 101 and gNB 102. UEs 111, 112 and 113 receive multicast services from gNB 101. UEs 121 and 122 receive multicast services from gNB 102. Multicast service-2 is provided by gNB 101 to the UE group of UEs 116, 117, and 118. Multicast service-1 and multicast service-2 are delivered in multicast mode with a multicast radio bearer (MRB) configured by the NR wireless network. The receiving UEs receives data packets of the multicast service through corresponding configured MRB. UE 111 receives multicast service-1 from gNB 101. gNB 102 provides multicast service-1 as well. UE 121 is configured with multicast service-1. UE 121 is configured with multicast RB as well as the unicast RB 132. UE 121 receives MBS data packets through the unicast RB 132 together with the multicast RB. The unicast RB 132 is used to provide reliable MBS for UE 121. Similarly, UEs 111, 112, and 113 receive multicast serine-1 through corresponding multicast RB and/or the unicast RB. Each UE receiving MBS is also configured with at least one corresponding unicast RB for reliability. Similarly, for multicast service-2, UEs 116, 117, and 118 receive multicast serine-2 through corresponding multicast RB and/or unicast RB. Each UE receiving MBS is also configured with at least one corresponding unicast RB for reliability. In one scenario, multicast services are configured with unicast radio bearers. A multicast service-3 is delivered to UE 113 and UE 114 via unicast radio link 131 and 134, respectively. In one embodiment, the MBS delivered through unicast bearer through PTP protocol stack are switched to PTM leg configured for the UE upon detecting predefined events. The gNB, upon detecting one or more triggering event, switches service mode from unicast to multicast using PTM legs.

FIG. 1 further illustrates simplified block diagrams of a base station and a mobile device/UE that supports the UE combined HARQ process for MBS in a wireless network. gNB 102 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 102. Memory 151 stores program instructions and data 154 to control the operations of gNB 102. gNB 102 also includes a set of control modules 155 that carry out functional tasks to communicate with mobile stations.

FIG. 1 also includes simplified block diagrams of a UE, such as UE 111. The UE has an antenna 165, which transmits and receives radio signals. An RF transceiver circuit 163, coupled with the antenna, receives RF signals from antenna 165, converts them to baseband signals, and sends them to processor 162. In one embodiment, the RF transceiver may comprise two RF modules (not shown). A first RF module is used for High Frequency (HF) transmitting and receiving, and the other RF module is used for different frequency bands transmitting and receiving which is different from the HF transceiver. RF transceiver 163 also converts received baseband signals from processor 162, converts them to RF signals, and sends out to antenna 165. Processor 162 processes the received baseband signals and invokes different functional modules to perform features in UE 111. Memory 161 stores program instructions and data 164 to control the operations of UE 111. Antenna 165 sends uplink transmission and receives downlink transmissions to/from antenna 156 of gNB 102.

The UE also includes a set of control modules that carry out functional tasks. These control modules can be implemented by circuits, software, firmware, or a combination of them. An MBS configuration module 191 configures an MBS with a network node in the wireless network. A protocol module 192 configures a point-to-multipoint (PTM) leg and a point-to-point (PTP) leg for the MBS between the UE and the network node. An HARQ control module 193 establishes a UE combined HARQ process to receive HARQ transmissions for the MBS from both the PTM leg and the PTP leg. A combining module 194 combines received MBS data packets based on outputs of the UE combined HARQ process. A feedback module 195 sends HARQ feedback to the network node.

Figure 2:
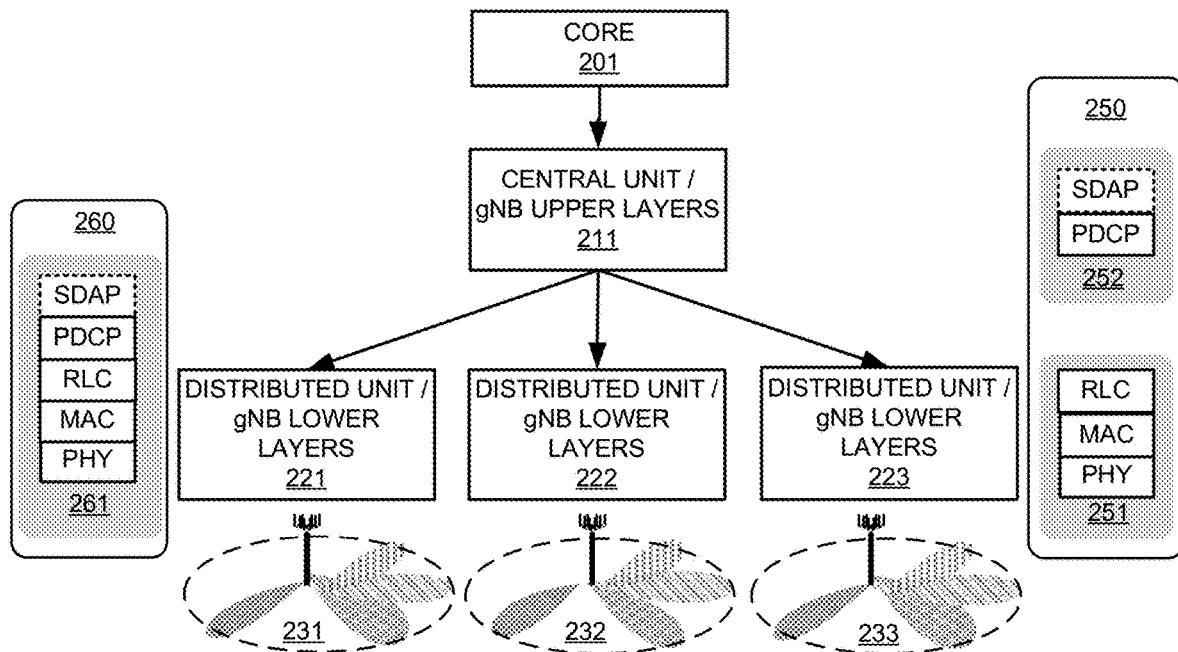
FIG. 2 illustrates an exemplary NR wireless system with centralized upper layers of the NR radio interface stacks.

FIG. 2 illustrates an exemplary NR wireless system with centralized upper layers of the NR radio interface stacks. Different protocol split options between central unit (CU) and distributed unit (DU) of gNB nodes may be possible. The functional split between the CU and DU of gNB nodes may depend on transport layer. Low performance transport between the CU and DU of gNB nodes can enable higher protocol layers of the NR radio stacks to be supported in the CU, since the higher protocol layers have lower performance requirements on the transport layer in terms of bandwidth, delay, synchronization, and jitter. In one embodiment, SDAP and PDCP layers are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 connects with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stack 261 including SDAP, PDCP, RLC, MAC and PHY layers.

There are two delivery methods for the transmission of MBS packet flows over radio. Point-to-Multipoint (PTM) delivery method means a radio area network (RAN) node delivers a single copy of MBS data packets over radio to a set of UEs. Point-to-Point (PTP) delivery method means a RAN node delivers separate copies of MBS data packet over radio to individual UE. The RAN node (e.g., gNB) may use PTM, PTP or a combination of PTP/PTM mode to deliver the MBS data of a particular MBS service to the interested UEs within a cell. Taking account of the requirement to support reliable multicast transmission, a companion PTP transmission may be used to perform UE specific retransmissions.

Figure 3:
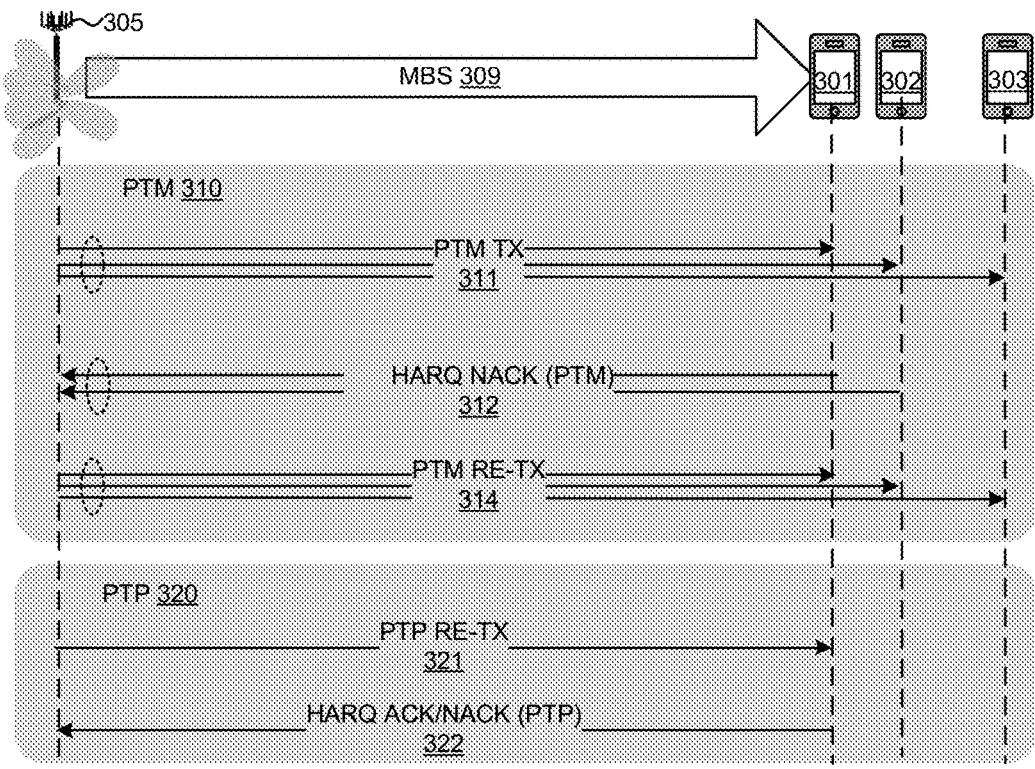
FIG. 3 illustrates exemplary diagrams for the PTM HARQ for the MBS and the PTP HARQ for the MBS.

FIG. 3 illustrates exemplary diagrams for the PTM HARQ for the MBS and the PTP HARQ for the MBS. UEs 301, 302, and 303 are configured with MBS service 309 with the network node, such as a gNB, 305. A PTM link 310 is established for the MBS with a multicast and broadcast channel configuration. A PTP link is established for each UE receiving the MBS, such as PTP link 320. Network node 305 transmits MBS service through PTM transmission 311 to UE 301, 302, and 303. In one embodiment, PTM HARQ feedback 312 is provided for the PTM transmission through the PTM leg. The PTM HARQ feedback is a NACK-only feedback. For example, UE 301 and UE 302 do not receive the packets correctly. HARQ NACK is sent to the network node 305 through the PTM leg with HARQ NACK. UE 303 receives it correctly and no HARQ NACK or ACK is sent to the network. For the NACK-only HARQ feedback, all the UEs receiving the MBS data share a single uplink feedback resource in a physical channel (e.g., PUCCH), and only provide HARQ NACK based feedback over the feedback resource. All the UEs transmit NACK in system frame number (SFN) manner. In one embodiment, the MBS data packets are retransmitted, at step 314, to UEs 301, 302, and 303 through the PTM leg. In one embodiment, the PTP link for each UE is established for MBS retransmission. The UE sends ACK/NACK-based HARQ feedback to the network through the PTP link. The UEs receiving the MBS data utilize separate feedback resource in a physical channel (e.g., PUCCH) for uplink feedback. In this case, a set of orthogonal feedback resource is used by the UEs. At step 321, network node 305 retransmits data packets to UE 301 through PTP link 320 at step 321. The UE sends HARQ ACK or HARQ NACK back to network node 305 at step 322. In another embodiment, HARQ feedback for the data received through the PTM leg is sent through the PTP leg established for the MBS.

From the unicast transmission from network to UE perspective, the MAC entity includes a HARQ entity for each UE, which maintains a number of parallel HARQ processes. The HARQ entity is responsible for directing the received MAC PDU from MAC layer to the corresponding HARQ processes. Each HARQ process is associated with a HARQ process identifier and a transmission buffer. The number of parallel DL HARQ processes per HARQ entity is specified in 3GPP TS 38.214 for NR. The HARQ process supports one TB when the physical layer is not configured for downlink spatial multiplexing. The HARQ process supports one or two TBs when the physical layer is configured for downlink spatial multiplexing. From the UE reception of unicast perspective, the MAC entity includes a HARQ entity for each serving cell, which maintains a number of parallel HARQ processes. The HARQ entity directs HARQ information and associated TBs received on Downlink Shared Channel (DL-SCH) to the corresponding HARQ processes.

In one novel aspect, a UE combined HARQ process is established to receive HARQ transmissions for the MBS from both the PTM leg and the PTP leg. The UE, which is configured with a MBS and configured with a PTM leg and a PTP leg for the MBS between the UE and the network node, combines the received MBS data packets based on outputs of the UE combined HARQ process and sends HARQ feedback to the network node.

Figure 4:
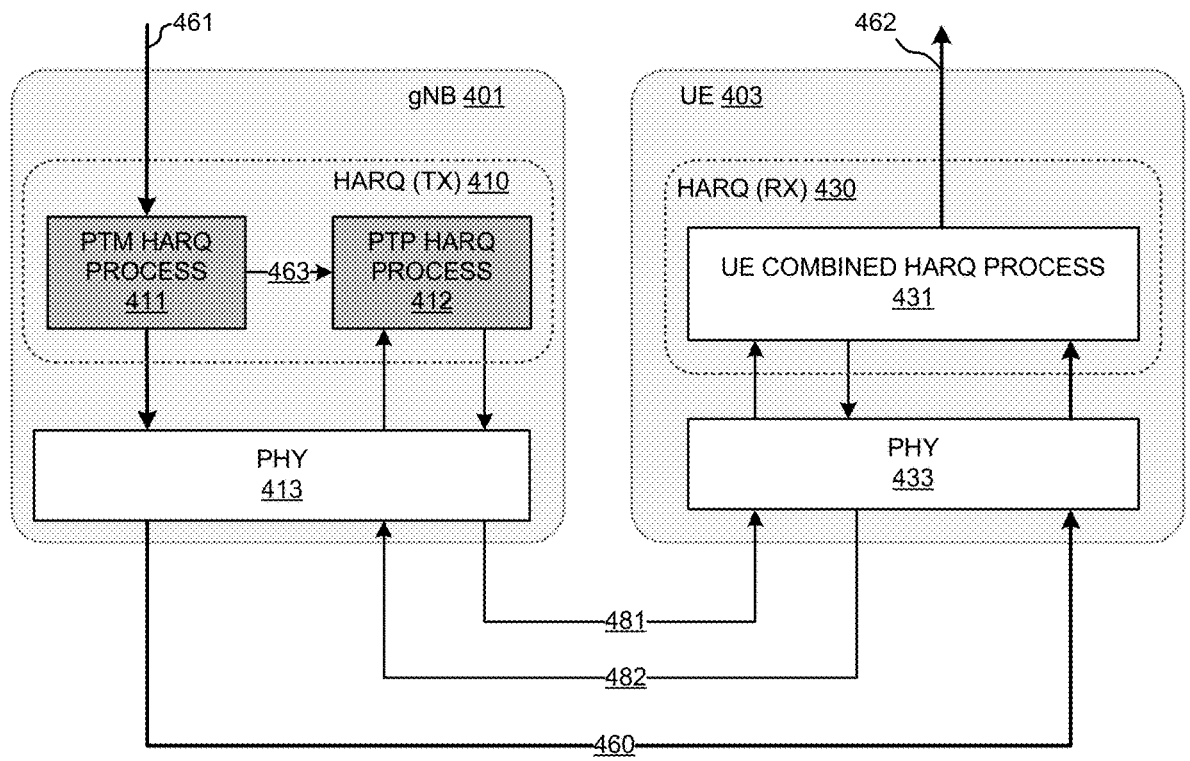
FIG. 4 illustrates exemplary diagrams for the UE with the UE combined HARQ process for the MBS in the wireless network.

FIG. 4 illustrates exemplary diagrams for the UE with the UE combined HARQ process for the MBS in the wireless network. A UE 403 is configured with MBS. UE 403 receives MBS data packets from network node, such as gNB 401. A multicast PTM leg 460 is established between UE 403 and gNB 401 for the MBS. In one embodiment, an uplink feedback channel is established for the PTM HARQ feedback with NACK-only. A unicast PTP leg is established for the MBS including a DL PTP 481 and an UL PTP 482. DL PTP link 481 carries MBS data packets with unicast physical downlink shared channel (PDSCH). UL PTP link 482 carries HARQ feedback at physical uplink control channel (PUCCH). In one embodiment, the PTM leg is scrambled by a specific radio network temporary identifier (RNTI) selecting from a group RNTI (G-RNTI) and a configured scheduling RNTI (CS-RNTI) and the PTP leg is scrambled by a cell RNTI (C-RNTI).

gNB 401 has a protocol stack including a PHY 413 and an MBS transmitting side HARQ process 410. UE 403, on the MBS receiving side, has a protocol stack including a PHY 433 and a HARQ process 430. In one embodiment, UE HARQ process 430 is configured with UE combined HARQ process 431. Network HARQ process 410 is configured with a network PTM HARQ process 411 and a network PTP HARQ process 412. When there are multiple UEs that require HARQ retransmission for the transmission block, the network HARQ process 410 establishes one independent PTP HARQ process for each UE. Network PTM HARQ process 411, at step 461, receives MBS MAC packet data unit (PDU) from upper layer for transmission. gNB 401 sends the initial data packet through PTM leg 460. UE 403, at step 462, sends the received data packets for MAC demultiplexing and disassembly. In one embodiment, at step 463, network PTM HARQ process 411 coordinates with network PTP HARQ process 412 for one or more elements including retransmission packets, RV version of the data packets, and HARQ process IDs. UE combined HARQ process 431 is responsible for the soft combining based on the received transmission block (TB). UE combined HARQ process 431 receives both PTM based HARQ transmission and PTP based HARQ retransmission for the same TB. The single/combined HARQ process 431 at UE corresponds two independent HARQ processes, network PTM HARQ process 411 and network PTM HARQ process 412 at gNB.

In another embodiment, two single UE HARQ processes are configured for the network PTM HARQ process 411 and network PTP HARQ process 412, respectively. The PTP HARQ process is a companion HARQ process for the PTM HARQ process. The companion PTP HARQ process is not responsible for the soft combining. The PTM HARQ process is responsible for soft combining based on the transmission block (i.e., TB) received from both PTM HARQ process and companion PTP HARQ process. The PTM HARQ process and PTP HARQ process may receive different RV version of the same TB. The PTM HARQ process and PTP HARQ process can have independent reception buffer and then the PTP HARQ process needs to deliver the received TB to PTM HARQ process in order to allow the PTM HARQ process to execute the HARQ combining based on the data received from both HARQ processes. Alternatively, the PTM HARQ process can deliver the stored TB in its soft buffer to PTP HARQ process in order to allow the PTP HARQ process to execute the HARQ combining based on the data received from both HARQ processes. In one embodiment, the PTM HARQ process and the companion PTP HARQ process share the same reception buffer at the UE.

In yet another embodiment, the network is configured with one HARQ process for the PTM HARQ and one or more PTP HARQ handling. Correspondingly, one UE HARQ process is configured corresponding to the one network HARQ process. When there are multiple UEs that require PTP based HARQ retransmission for a particular transmission block, the network HARQ process can generate multiple PTP based HARQ retransmission one by one. For example, if there are N HARQ processes are used for the transmission of a certain MBS service, the PTP based HARQ retransmission for a particular transmission block can be scheduled every N transmission occasions (e.g., TTIs). Assuming that one transmission occasion is one millisecond and that there are M UEs that require PTP based HARQ retransmission, it will take N*M millisecond to finish the first round of the PTP based HARQ retransmission for all of the UEs. The network HARQ process cannot transmit new TBs to the UEs in PTM manner until the HARQ process finishes the transmission of the previous TB. Considering the needed HARQ retransmission for multiple UEs in PTP manner, it may take a long time. This will block the transmission of the new TBs and unnecessary delay is introduced at physical layer, which is not expected by delay sensitive MBS services.

From the UE reception of unicast perspective, for each received TB and associated HARQ information, the HARQ process shall consider this transmission to be a new transmission if this is the very first received transmission for this TB (i.e. there is no previous NDI for this TB) or if the NDI, when provided, has been toggled compared to the value of the previous received transmission corresponding to this TB, otherwise, the HARQ process shall consider this transmission to be a retransmission. For the new transmission, the MAC entity shall attempt to decode the received data. If this is a retransmission, the MAC entity instructs the physical layer to combine the received data with the data currently in the soft buffer for this TB and attempt to decode the combined data if the data for this TB has not yet been successfully decoded. If the data which the MAC entity attempted to decode was successfully decoded for this TB, the MAC entity delivers the decoded MAC PDU to the disassembly and demultiplexing entity at MAC layer, otherwise, the MAC entity instructs the physical layer to replace the data in the soft buffer for this TB with the data which the MAC entity attempted to decode. Then the MAC entity may instruct the physical layer to generate acknowledgement(s) of the data in this TB.

In one novel aspect, the UE combined HARQ process receives HARQ transmission and retransmission from the network node. The UE performs combining for the HARQ data packets. The UE needs to identify the TBs from both the PTM leg and the PTP leg by associating the data packets from the PTM leg and the PTP leg. Further, the UE needs to identify whether the TBs received are initial transmission or retransmission.

Figure 5:
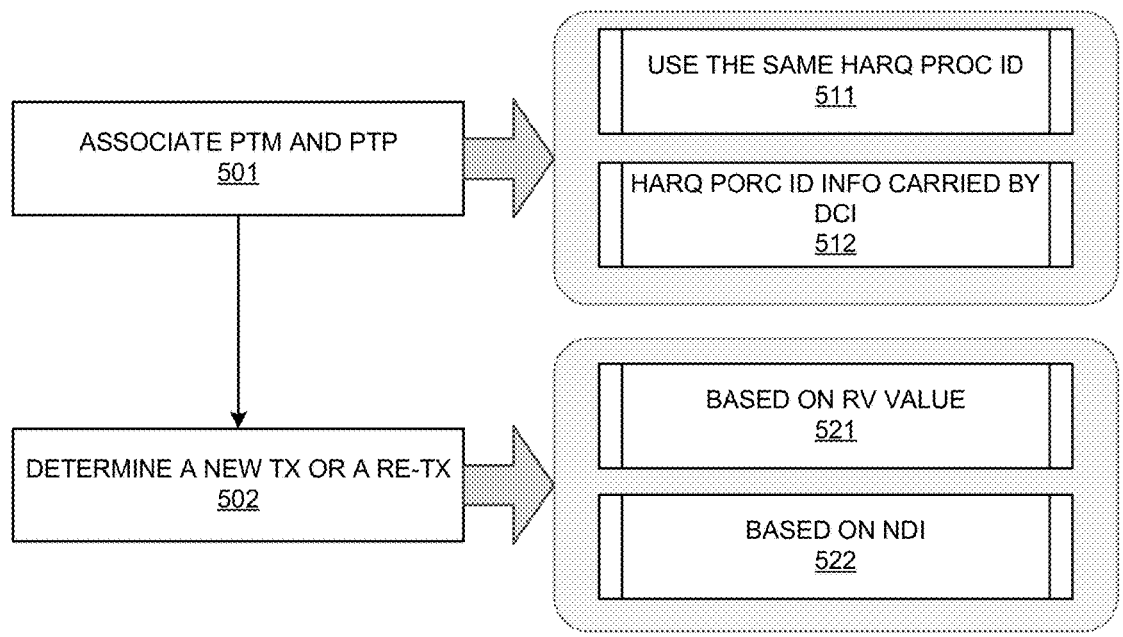
FIG. 5 illustrates exemplary flow diagrams for data packets combining using the UE combined HARQ process for MBS in the wireless network.

FIG. 5 illustrates exemplary flow diagrams for data packets combining using the UE combined HARQ process for MBS in the wireless network. At step 501, the UE, in combining the HARQ data packets, associates one or more TBs from the PTM leg and the PTP leg. In one embodiment 511, data packets received from the network PTM HARQ process and from the network PTP HARQ process share a same HARQ process ID. The UE identifies the TBs based on the HARQ process ID. For each received TB and associated HARQ information according to PTP based HARQ transmission, the MAC entity shall assign the same HARQ process to handle the received data for both PTM and PTP based transmission for the same TB and the UE combined HARQ process considers this transmission as retransmission of a previous TB. It assumes the NDI, when provided, should not be toggled compared to the value of the previous received transmission corresponding to this TB. Then the MAC entity instructs the physical layer to combine the received data with the data currently in the soft buffer for this TB (e.g., received according to PTM reception) and attempts to decode the combined data if the data for this TB has not yet been successfully decoded. In another embodiment 512, HARQ ID information is carried in downlink control information (DCI) for the PTM leg and the PTP leg for MBS data packets, and wherein the UE combined HARQ process associates MBS data packets received from the PTM leg and the PTP leg based on the HARQ ID information. There are two HARQ feedback options. If a first option HARQ feedback is used, the DCI scheduling multicast PDSCH can carry a single uplink PUCCH resource for all of the UEs and that PUCCH resource is shared by all of the UEs for uplink HARQ feedback. If a second option HARQ feedback is used, the network needs to indicate independent uplink PUCCH resource for each UE receiving the multicast PDSCH in connected mode. An independent uplink PUCCH resource for each UE can be indicated to each UE via UE specific DCI, via MAC CE, or via RRC message. The independent uplink PUCCH resource for each UE is used by the UE to provide the uplink HARQ feedback based on the very first HARQ transmission of TB in PTM transmission manner and/or PTM based HARQ retransmission. When the HARQ retransmission is performed via UE specific PTP manner, the uplink HARQ feedback resource can be indicated by legacy approach. The uplink HARQ feedback from the UE is taken by the gNB to decide if PTM based HARQ retransmission is needed for the corresponding TB and to decide if the PTP based HARQ retransmission is needed for the corresponding TB to a specific UE.

At step 502, the UE determines whether the TB is a new transmission or a retransmission. In one embodiment 521, the UE combines the TBs based on redundant version (RV) value. In another embodiment 522, the UE determines the retransmission of the TB based on the new data indication (NDI). In embodiment 521, the initial transmission of a particular TB is based on RV value=0, and the succeeding retransmission is based on RV value=2, RV value=3, RV value=1 and then wrap-up from RV value=0. The gNB can schedule the HARQ process to perform PTM based HARQ transmission for the purpose of the initial transmission of a particular TB, and such transmission can be based on the initial version of RV of the HARQ transmission (e.g., RV value=0). The gNB can also schedule the same HARQ process to perform PTM based HARQ retransmission for the purpose of the retransmission of a particular TB, and such retransmission can be based on the succeeding version of RV of the HARQ transmission (e.g., RV value=2). The HARQ PTM retransmission scheduled by the gNB can be based on the uplink HARQ feedback from the UE. The gNB can schedule the HARQ process to perform PTP based HARQ retransmission for the purpose of the retransmission of a particular TB and such retransmission can be based on the succeeding version RV of the HARQ transmission (e.g., RV value=3). The HARQ PTP retransmission scheduled by the gNB can be based on the uplink HARQ feedback from the UE. The RV value of the TB used for the PTP based HARQ retransmission should be the succeeding RV value following the initial PTM based HARQ transmission and/or retransmission. The HARQ PTP retransmission scheduled by the gNB can be based on the uplink HARQ feedback from the UE. The number of retransmission performed by PTM HARQ process, and the RV value used in such PTM retransmissions for the TB can be preconfigured by default configuration, and/or configured from the network to the UE via L1, L2 or L3 signaling. Accordingly, the RV version of the TB to be used by the PTP HARQ process for retransmission can be calculated autonomously. In one embodiment, a number of retransmissions and associated RV versions used by the network PTM HARQ process is preconfigured, and wherein the RV value for the network PTP HARQ process is calculated autonomously. In another embodiment, the RV value is used to indicate a HARQ retransmission, wherein the network PTM HARQ process indicate the RV value to the network PTP HARQ process for HARQ retransmission through the PTP leg. In another embodiment, the RV value for the network PTP HARQ process is delivered from the network PTM HARQ process to the network PTP HARQ process.

Figure 6:
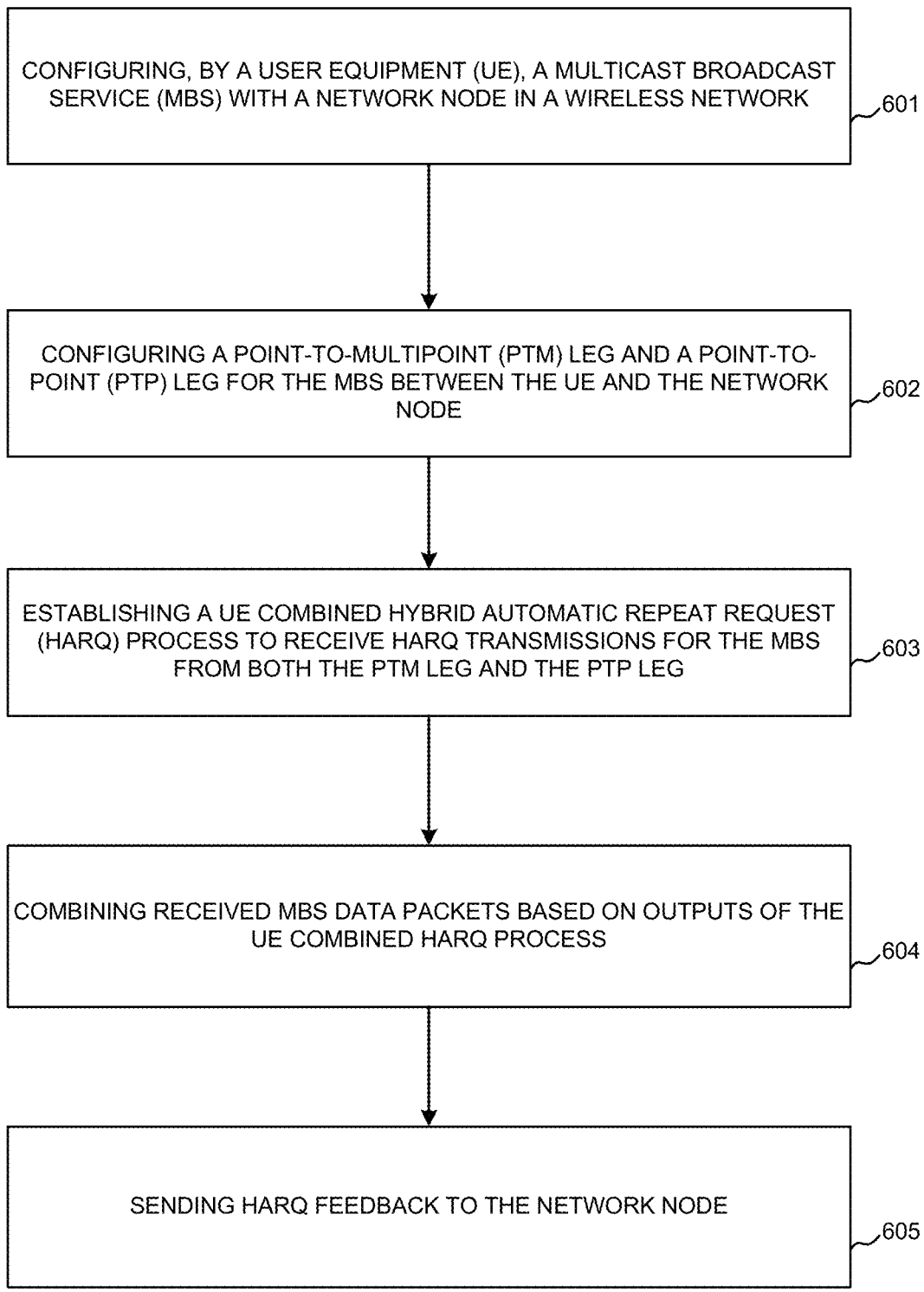
FIG. 6 illustrates an exemplary flow chart for the HARQ operation with the UE combined HARQ process for MBS in the wireless network.

FIG. 6 illustrates an exemplary flow chart for the HARQ operation with the UE combined HARQ process for MBS in the wireless network. At step 601, the UE configures a multicast broadcast service (MBS) with a network node in a wireless network. At step 602, the UE configures a point-to-multipoint (PTM) leg and a point-to-point (PTP) leg for the MBS between the UE and the network node. At step 603, the UE establishes a UE combined hybrid automatic repeat request (HARQ) process to receive HARQ transmissions for the MBS from both the PTM leg and the PTP leg. At step 604, the UE combines received MBS data packets based on outputs of the UE combined HARQ process. At step 605, the UE sends HARQ feedback to the network node.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    configuring, by a user equipment (UE), a multicast broadcast service (MBS) with a network node in a wireless network;
    configuring a point-to-multipoint (PTM) leg and a point-to-point (PTP) leg for the MBS between the UE and the network node;
    establishing a UE combined hybrid automatic repeat request (HARQ) process to receive HARQ transmissions for the MBS from both the PTM leg and the PTP leg;
    combining received MBS data packets based on outputs of the UE combined HARQ process; and
    sending HARQ feedback to the network node.

2. The method of claim 1, wherein the HARQ transmission received from the PTM leg is from a network PTM HARQ process, and the HARQ transmission received from the PTP leg is from a network PTP HARQ process for the UE.

3. The method of claim 2, wherein a new data indicator (NDI) is used to indicate a HARQ retransmission, and wherein the HARQ retransmission is from one path selecting from the PTM leg and the PTP leg.

4. The method of claim 2, wherein a redundant version (RV) value is used to indicate a HARQ retransmission, wherein the network PTM HARQ process indicate the RV value to the network PTP HARQ process for HARQ retransmission through the PTP leg.

5. The method of claim 4, wherein a number of retransmissions and associated RV values used by the network PTM HARQ process are preconfigured, and wherein the RV value for the network PTP HARQ process is calculated autonomously.

6. The method of claim 4, wherein the RV value for the network PTP HARQ process is delivered from the network PTM HARQ process to the network PTP HARQ process.

7. The method of claim 2, wherein data packets received from the network PTM HARQ process and from the network PTP HARQ process share a same HARQ process identification (ID).

8. The method of claim 2, wherein HARQ ID information is carried in downlink control information (DCI) for the PTM leg and the PTP leg for MBS data packets, and wherein the UE combined HARQ process associates MBS data packets received from the PTM leg and the PTP leg based on the HARQ ID information.

9. The method of claim 1, wherein the PTM leg is scrambled by a specific radio network temporary identifier (RNTI) selecting from a group RNTI (G-RNTI) and a configured scheduling RNTI (CS-RNTI) and the PTP leg is scrambled by a cell RNTI (C-RNTI).

10. The method of claim 1, wherein the UE combined HARQ process sends the HARQ feedback for data packets received from the PTM leg through the PTM leg and sends HARQ feedback for data packets received from the PTP leg through the PTP leg.

11. A user equipment (UE), comprising:
    a transceiver that transmits and receives radio frequency (RF) signal in a wireless network;
    a multicast broadcast service (MBS) configuration module that configures an MBS with a network node in the wireless network;
    a protocol module that configures a point-to-multipoint (PTM) leg and a point-to-point (PTP) leg for the MBS between the UE and the network node;
    a hybrid automatic repeat request (HARQ) control module that establishes a UE combined HARQ process to receive HARQ transmissions for the MBS from both the PTM leg and the PTP leg;
    a combining module that combines received MBS data packets based on outputs of the UE combined HARQ process; and
    a feedback module that sends HARQ feedback to the network node.

12. The UE of claim 11, wherein the HARQ transmission received from the PTM leg is from a network PTM HARQ process, and the HARQ transmission received from the PTP leg is from a network PTP HARQ process for the UE.

13. The UE of claim 12, wherein a new data indicator (NDI) is used to indicate a HARQ retransmission, and wherein the HARQ retransmission is from one path selecting from the PTM leg and the PTP leg.

14. The UE of claim 12, wherein a redundant version (RV) value is used to indicate a HARQ retransmission, wherein the network PTM HARQ process indicate the RV value to the network PTP HARQ process for HARQ retransmission through the PTP leg.

15. The UE of claim 14, wherein a number of retransmissions and associated RV values used by the network PTM HARQ process are preconfigured, and wherein the RV value for the network PTP HARQ process is calculated autonomously.

16. The UE of claim 14, wherein the RV value for the network PTP HARQ process is delivered from the network PTM HARQ process to the network PTP HARQ process.

17. The UE of claim 12, wherein data packets received from the network PTM HARQ process and from the network PTP HARQ process share a same HARQ process identification (ID).

18. The UE of claim 12, wherein HARQ ID information is carried in downlink control information (DCI) for the PTM leg and the PTP leg for MBS data packets, and wherein the UE combined HARQ process associates MBS data packets received from the PTM leg and the PTP leg based on the HARQ ID information.

19. The UE of claim 11, wherein the PTM leg is scrambled by a specific radio network temporary identifier (RNTI) selecting from a group RNTI (G-RNTI) and a configured scheduling RNTI (CS-RNTI) and the PTP leg is scrambled by a cell RNTI (C-RNTI).

20. The UE of claim 11, wherein the UE combined HARQ process sends the HARQ feedback for data packets received from the PTM leg through the PTM leg and sends HARQ feedback for data packets received from the PTP leg through the PTP leg.

\* \* \* \* \*